UNITED STATES PATENT OFFICE.

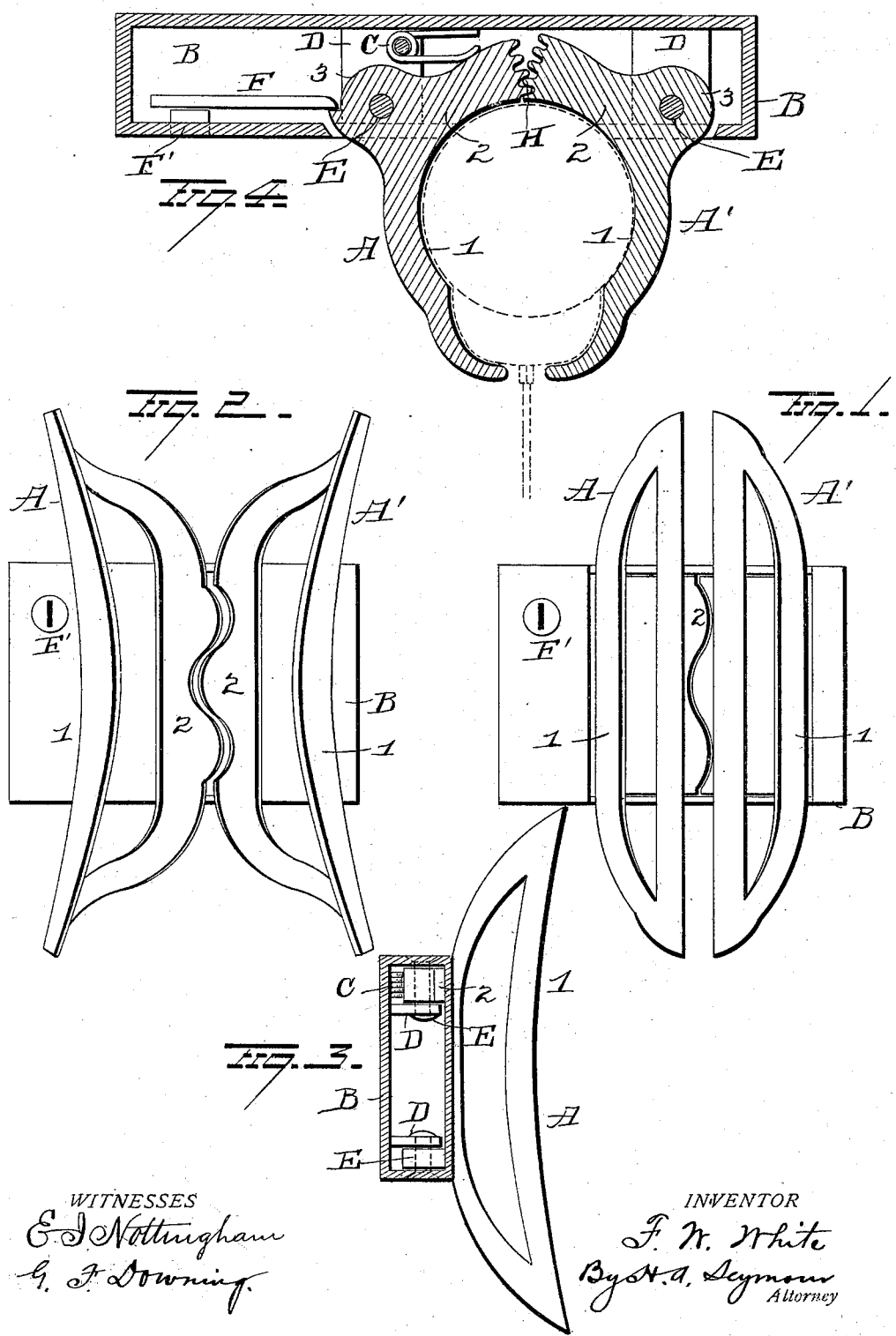

FRANK W. WHITE, OF MARION, INDIANA.

LOCK AND SUPPORT FOR BICYCLES.

SPECIFICATION forming part of Letters Patent No. 611,401, dated September 27, 1898.

Application filed December 28, 1897. Serial No. 663,983. (No model.)

*To all whom it may concern:*

Be it known that I, FRANK W. WHITE, a resident of Marion, in the county of Grant and State of Indiana, have invented certain new and useful Improvements in Locks and Supports for Bicycles; and I do hereby declare the following to be a full, clear, and exact description of the invention, such as will enable others skilled in the art to which it appertains to make and use the same.

My invention relates to an improved support and lock for bicycles, the object of the invention being to provide a simple and efficient device for securely locking and supporting a bicycle or similar vehicle in an upright position and which can be conveniently located in public places where it may be desired to leave a bicycle for a short time.

With this object in view the invention consists in certain novel features of construction and combinations and arrangements of parts, as hereinafter set forth, and pointed out in the claims.

In the accompanying drawings, Figure 1 is a face view of my improvements, showing the jaws closed. Fig. 2 is a similar view with the jaws open. Fig. 3 is an end view with the box or casing in section, and Fig. 4 is a horizontal sectional view.

B represents a box or casing provided in one face with an opening for the accommodation of jaws A A'. Each jaw comprises two arms 1 2, the arms 1 being adapted to be disposed at the respective sides of the tire and rim of a bicycle-wheel and partially embrace the same and the arms 2 of the respective jaws being arranged to project toward each other and coöperate with the arms 1 in embracing the tire. Each jaw is provided at the juncture of its two arms with lugs or ears 3, which are pivotally connected within the box or casing by means of pins E, passing through them and also through lugs D in said box or casing and the walls of the latter. The inner extremities of the arms 2 of the respective jaws are preferably made curved or serpentine in form and adapted to intermesh, as shown in Figs. 1 and 2. The arms 2 are also provided with intermeshing teeth H, so that when one of the jaws is moved the other will be moved also and so that when one jaw is locked both will be locked. A suitable spring-lock F will be disposed within the part B' of the box or casing B and adapted to engage a shoulder on the jaw A, said shoulder being located in proximity to the pivotal support of said jaw.

The box or casing can be conveniently secured by any suitable fastening devices to a rack, post, or wall at such height that when a bicycle is run up to it the tire and rim of the wheel will enter between the jaws and, engaging the inner ends of the arms 2 of the jaws, cause said jaws to close about said tire and rim and become automatically locked.

By making the engaging ends of the arms 2 irregular or serpentine in form there will be no danger of the tire being pinched thereby. In order to release the wheel, it is simply necessary to withdraw the bolt of the lock by means of a suitable key inserted at F'; but to avoid any possibility of the jaws not promptly opening when unlocked, which in such case might result injuriously to the tire or rim, or both, in the effort of the rider to remove the bicycle from the jaws, I prefer to employ a spring C, adapted to bear against the arm 2 of one of the jaws and promptly force the jaws open as soon as they are released by the lock.

While I have shown and described both jaws as being pivotally connected with the box or casing, still my improvements will operate successfully if only one of the jaws be pivotally supported.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. A support for bicycles comprising a box or casing, having a lock thereon, and a pair of jaws pivoted in the box at points remote from each other, the interior shape of the jaws conforming to the shape of the tire and rim and their inner ends intermeshed at a point between the pivots where they are struck by the wheel of the machine to cause them to close and lock upon the rim of the wheel and the lock adapted to secure them in place.

2. A support for bicycles comprising a box or casing, a pair of jaws pivotally supported therein, these jaws comprising two arms, the inner ends of the inner arms of curved or serpentine form and provided with intermeshing teeth, and means locking these jaws in their closed position.

3. A support for bicycles, comprising a box, a pair of jaws pivoted therein, the inner faces of the jaws made to conform to the cross-sectional shape of a wheel tire and rim, the jaws each comprising two arms, the outer angles of which are pivoted and the inner ends of the inside arms having teeth which intermesh with each other, one arm having a lug therein and a lock engaging said lug.

In testimony whereof I have signed this specification in the presence of two subscribing witnesses.

FRANK W. WHITE.

Witnesses:
LEE STEVENS,
D. F. SHAFER.